(12) United States Patent  (10) Patent No.: US 9,239,969 B1
Yamada  (45) Date of Patent: Jan. 19, 2016

(54) IMAGE FORMING DEVICE, IMAGE FORMING METHOD, AND NON-TRANSITORY COMPUTER READABLE MEDIUM

(71) Applicant: FUJI XEROX CO., LTD., Tokyo (JP)

(72) Inventor: Junya Yamada, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/613,597

(22) Filed: Feb. 4, 2015

(30) Foreign Application Priority Data

Sep. 17, 2014 (JP) ................................. 2014-189064

(51) Int. Cl.
*G06F 15/00* (2006.01)
*G06F 3/12* (2006.01)
*G06K 1/00* (2006.01)
*G06K 15/00* (2006.01)
*G06K 15/02* (2006.01)

(52) U.S. Cl.
CPC .......... *G06K 15/002* (2013.01); *G06K 15/1803* (2013.01)

(58) Field of Classification Search
USPC ................................................. 358/1.1–1.18
See application file for complete search history.

(56) References Cited

U.S. PATENT DOCUMENTS

| 8,570,575 B2 * | 10/2013 | Fujiwara ...................... 358/1.15 |
| 8,854,664 B2 | 10/2014 | Yoshimura et al. |
| 2005/0012770 A1 * | 1/2005 | Endo ................................ 347/19 |

FOREIGN PATENT DOCUMENTS

JP 2013-3725 A 1/2013

* cited by examiner

*Primary Examiner* — Douglas Tran
(74) *Attorney, Agent, or Firm* — Sughrue Mion, PLLC

(57) ABSTRACT

An image forming device includes an acquisition unit and a display controller. The acquisition unit accesses multiple storage devices in units of a certain number of storage devices in order starting with a storage device having a highest priority to acquire information concerning image data stored in a certain number of storage devices equal to the number of storage devices in each unit. The display controller causes information concerning image data acquired from a certain number of storage devices having a first priority, equal to the number of storage devices in each unit, to be displayed on a display. In response to receipt of instructions to continue acquisition, the display controller causes information concerning image data acquired from a certain number of storage devices having a second priority next to the first priority, equal to the number of storage devices in each unit, to be displayed on the display.

17 Claims, 16 Drawing Sheets

FIG. 5

| STORAGE DATE AND TIME | USER ID | IMAGE DATA |
|---|---|---|
| 7/14/2014 10:00 | user001 | IMAGE DATA D1 |
| 7/14/2014 10:10 | user002 | IMAGE DATA D3 |
| 7/14/2014 10:20 | user001 | IMAGE DATA D2 |
| ... | ... | ... |

FIG. 6

| USER ID | NUMBER OF STORAGE OPERATIONS |
|---|---|
| user001 | 10 |
| user002 | 8 |
| user003 | 6 |
| ... | ... |

FIG. 9

(user001) ~22

| DEVICE | PRIORITY |
|---|---|
| DEVICE A | 1 |
| DEVICE B | 2 |
| DEVICE C | 3 |
| DEVICE D | 4 |

FIG. 10

| ACQUISITION DATE AND TIME | USER ID | DEVICE |
|---|---|---|
| 7/14/2014 10:00 | user001 | DEVICE B |
| 7/14/2014 10:10 | user002 | DEVICE A |
| 7/14/2014 10:20 | user001 | DEVICE C |
| ... | ... | ... |

FIG. 12

(user001)

| DEVICE | NUMBER OF ACQUISITION OPERATIONS |
|---|---|
| DEVICE A | 4 |
| DEVICE B | 6 |
| DEVICE C | 8 |
| DEVICE D | 10 |

FIG. 13

22 (user001)

| DEVICE | PRIORITY |
|---|---|
| DEVICE A | 4 |
| DEVICE B | 3 |
| DEVICE C | 2 |
| DEVICE D | 1 |

FIG. 15

<DEVICE A (user001)>

| IMAGE DATA | CREATION DATE AND TIME |
|---|---|
| IMAGE DATA D5 | 3/18/2014 17:00 |
| | |

<DEVICE B (user001)>

| IMAGE DATA | CREATION DATE AND TIME |
|---|---|
| IMAGE DATA D6 | 3/18/2014 18:00 |
| IMAGE DATA D7 | 3/17/2014 11:00 |

<DEVICE C (user001)>

| IMAGE DATA | CREATION DATE AND TIME |
|---|---|
| IMAGE DATA D8 | 3/16/2014 10:00 |
| IMAGE DATA D9 | 3/15/2014 19:10 |
| | |

<DEVICE D (user001)>

| IMAGE DATA | CREATION DATE AND TIME |
|---|---|
| IMAGE DATA D4 | 3/18/2014 19:03 |
| IMAGE DATA D3 | 3/18/2014 17:51 |
| IMAGE DATA D2 | 3/17/2014 14:11 |
| IMAGE DATA D1 | 3/16/2014 12:00 |

FIG. 16

| <DEVICE A (user001)> |
|---|
| PRIORITY ORDER |
| DEVICE D |
| DEVICE A |
| DEVICE B |
| DEVICE C |

# IMAGE FORMING DEVICE, IMAGE FORMING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2014-189064 filed Sep. 17, 2014.

BACKGROUND (i) Technical Field

The present invention relates to an image forming device, an image forming method, and a non-transitory computer readable medium.

(ii) Related Art

In some cases, an image forming device may access all the image forming devices included in a system to acquire information concerning image data, display a list of pieces of image data after the information has been acquired, and print a piece of image data selected from the list by a user.

SUMMARY

According to an aspect of the invention, there is provided an image forming device including an acquisition unit and a display controller. The acquisition unit accesses multiple storage devices each having image data stored therein. The multiple storage devices have priorities. The acquisition unit accesses the multiple storage devices in units of a certain number of storage devices in order starting with a storage device having a highest priority among the multiple storage devices to acquire information concerning image data stored in a certain number of storage devices, the number of which is equal to the number of storage devices in each unit. The display controller causes information concerning image data acquired from a certain number of storage devices having a first priority among the multiple storage devices, the number of which is equal to the number of storage devices in each unit, to be displayed on a display. In response to receipt of instructions to continue acquisition, the display controller causes information concerning image data acquired from a certain number of storage devices having a second priority next to the first priority among the multiple storage devices, the number of which is equal to the number of storage devices in each unit, to be displayed on the display.

BRIEF DESCRIPTION OF THE DRAWINGS

An exemplary embodiment of the present invention will be described in detail based on the following figures, wherein:

FIG. 5 illustrates an example of storage history information;

FIG. 6 illustrates an example of the numbers of storage operations;

FIG. 9 illustrates an example of priorities based on the numbers of storage operations;

FIG. 10 illustrates an example of acquisition history information;

FIG. 12 illustrates an example of the numbers of acquisition operations;

FIG. 13 illustrates an example of priorities based on the numbers of acquisition operations;

FIG. 15 illustrates an example of image data stored in individual image forming devices;

FIG. 16 illustrates an example of priorities;

DETAILED DESCRIPTION

Figure 1:
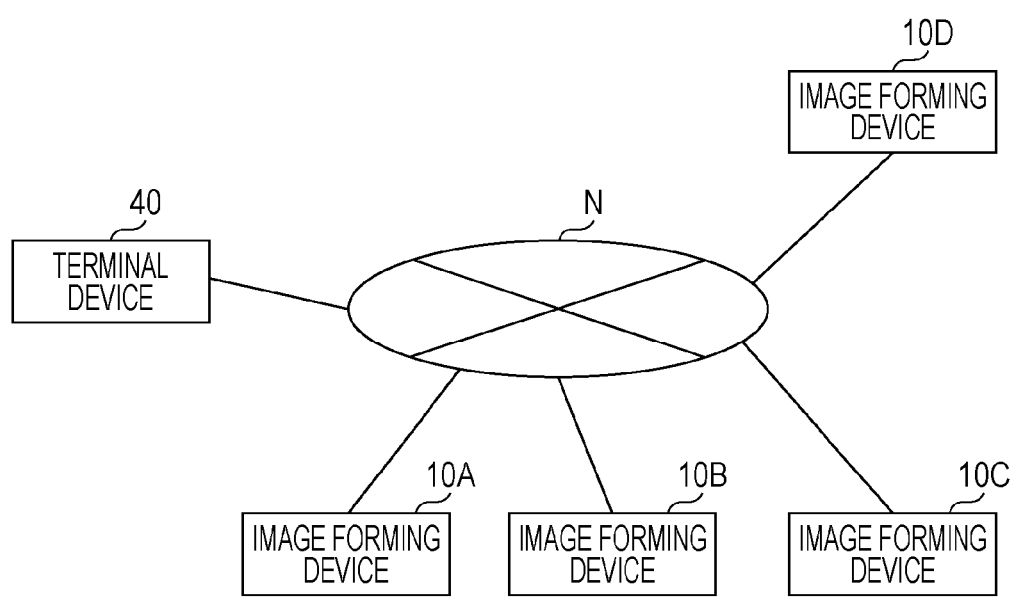
FIG. 1 is a block diagram illustrating an image forming system according to an exemplary embodiment of the present invention.

FIG. 1 illustrates an example of an image forming system according to an exemplary embodiment of the present invention. The image forming system includes multiple image forming devices (e.g., image forming devices 10A, 10B, 10C, and 10D). The image forming devices 10A, 10B, 10C, and 10D are hereinafter referred to as the "image forming devices 10", unless otherwise individually designated. The multiple image forming devices 10 are connected to a communication path N such as a network. A terminal device 40 is further connected to the communication path N. In the example illustrated in FIG. 1, the image forming system includes four image forming devices 10. This is merely an example, and it is sufficient that the image forming system includes multiple, other than four, image forming devices 10. Multiple terminal devices 40 may be connected to the communication path N.

Each of the image forming devices 10 may be, for example, an electrophotographic printer. The terminal device 40 has a function of transmitting image data to the image forming devices 10. The image forming devices 10 each have a function of storing image data transmitted from the terminal device 40.

Figure 2:
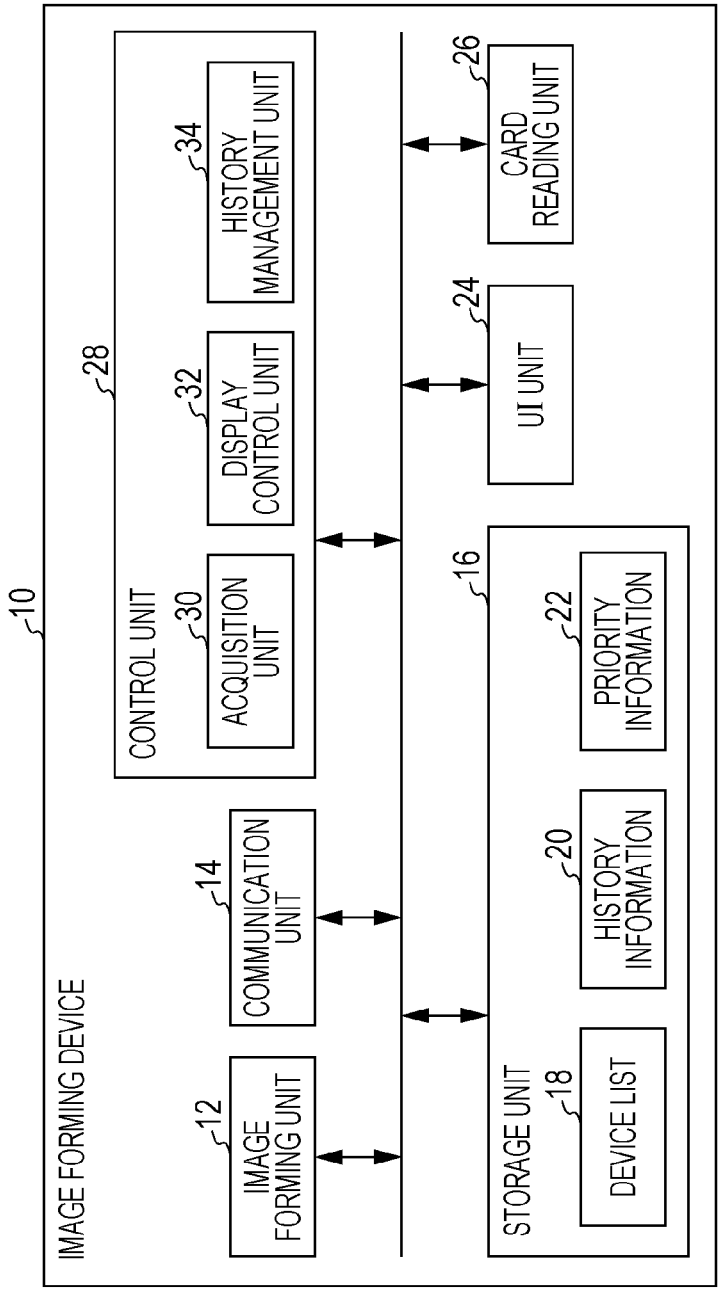
FIG. 2 is a block diagram illustrating an image forming device.

FIG. 2 illustrates a configuration of each of the image forming devices 10. An image forming unit 12 forms an image that is based on the image data on a recording medium such as a sheet of paper. A communication unit 14 is a communication interface to be connected to the communication path N. The communication unit 14 has a function of receiving data from another device, and a function of transmitting data to another device.

A storage unit 16 is a storage device such as a hard disk. The storage unit 16 stores image data transmitted from the terminal device 40, and authentication information for authenticating a user. The image data is accompanied by relevant information. The relevant information is, for example, meta-information of the image data, and includes, by way of example, image identification information (for example, an image data ID) for identifying the image data, information indicating the creation date and time of the image data, and user identification information (for example, a user ID) for identifying a user who stored the image data. The relevant information may also include information indicating the capacity of the image data, information indicating the data format of the image data, and so forth. The authentication information includes, for example, user identification information and personal identification number (PIN) information. The PIN information is information for verifying the identity of the user, examples of which include a password.

The storage unit 16 also stores a device list 18, history information 20, and priority information 22. The device list 18 is information indicating all the image forming devices 10 included in the image forming system. The device list 18 includes device identification information for identifying each of the image forming devices 10. The history information 20 includes at least one of storage history information and acquisition history information. The storage history information is information indicating, for each user, a history of storing image data in the associated one of the image forming devices 10. The acquisition history information is information indicating, for each user, a history of image forming devices 10 from which image data has been acquired. The priority information 22 is information indicating the priorities of the image forming devices 10 accessed by an acquisition unit 30 described below. The priorities are determined in accordance with the history information 20 (the storage history information or the acquisition history information). The priorities may also be determined by a user or an administrator. The device list 18, the history information 20, and the priority information 22 will be described in detail below.

A user interface (UI) unit 24 includes an operation unit and a display unit. The operation unit is an input device such as an operation panel. The display unit is a display device such as a liquid crystal display. A card reading unit 26 has a function of reading information stored in an authentication card (for example, an integrated circuit (IC) card). The authentication card has stored therein, for example, the user identification information and the PIN information that are included in the authentication information. The authentication card is passed to a user in advance in order to authenticate the user. The user identification information and the PIN information may be input by using the operation unit.

A control unit 28 controls the operation of each unit of the image forming device 10. For example, when image data and user identification information are transmitted from the terminal device 40, the control unit 28 stores the image data and the user identification information in the storage unit 16 in association with each other.

The control unit 28 includes an acquisition unit 30, a display control unit 32, and a history management unit 34. The acquisition unit 30 refers to the device list 18, and accesses the image forming devices 10 included in the device list 18. In this exemplary embodiment, the acquisition unit 30 accesses the image forming devices 10 in units of a certain number of image forming devices 10 in order according to the priorities indicated by the priority information, starting with the image forming device 10 with the highest priority. The number of image forming devices 10 in each unit may be one or more. That is, the acquisition unit 30 may access the image forming devices 10 one-by-one in order starting with the image forming device 10 with the highest priority, or may access the image forming devices 10 in units of several image forming devices 10 in order starting with the image forming device 10 with the highest priority. The number of image forming devices 10 in each unit may be changed as desired by an administrator or a user. If the number of image forming devices 10 in each unit is one, the image forming device 10 to be accessed may be the associated image forming device 10. The acquisition unit 30 acquires relevant information concerning the image data from the image forming device 10 to be accessed. For example, when user identification information is input from the operation unit of the UI unit 24 or from the card reading unit 26, the acquisition unit 30 acquires relevant information of the image data associated with the user identification information from the image forming device 10 to be accessed. The acquisition unit 30 has a function of acquiring designated image data from an image forming device 10. If the image forming device 10 to be accessed is the associated image forming device 10, the acquisition unit 30 accesses the storage unit 16 of the associated image forming device 10, and acquires relevant information and image data.

The display control unit 32 has a function of causing various information to be displayed on the display unit of the UI unit 24. In this exemplary embodiment, the display control unit 32 causes relevant information acquired by the acquisition unit 30 to be displayed on the display unit. For example, the display control unit 32 causes pieces of relevant information to be displayed on the display unit side-by-side in accordance with a predetermined display order. When a piece of relevant information is selected by a user, the acquisition unit 30 acquires image data corresponding to the piece of relevant information selected by the user from the image forming device 10 in which the image data is stored. Then, the image forming unit 12 forms an image that is based on the acquired image data on a sheet of paper.

The history management unit 34 creates the history information 20. That is, the history management unit 34 creates at least one of the storage history information and the acquisition history information.

In a case where the storage history information is used as the history information 20, the history management unit 34 manages, for each user, a history of storing image data in the associated image forming device 10, and creates storage history information. The history management unit 34 refers to the storage history information, and counts, for each user, the number of storage operations of image data to the associated image forming device 10. Then, the history management unit 34 determines the priorities of access to the image forming devices 10 in accordance with the counted numbers of storage operations, and creates priority information 22 indicating the priorities of access. For example, a higher priority of access is set to an image forming device 10 with a larger number of storage operations. The reason for this is that it is anticipated that an image forming device 10 with a larger number of storage operations will be more likely to have stored therein image data than an image forming device 10 with a comparatively smaller number of storage operations.

In a case where the acquisition history information is used as the history information 20, the history management unit 34 manages, for each user, a history of image forming devices 10 from which image data has been acquired, and creates acquisition history information. The history management unit 34 refers to the acquisition history information, and counts, for each user, the number of times image data has been acquired from each of the image forming devices 10. The history management unit 34 determines the priorities of access to the image forming devices 10 in accordance with the counted numbers of times image data has been acquired, and creates priority information 22 indicating the priorities of access. For example, a higher priority of access is set to an image forming device 10 from which the number of times image data has been acquired is larger. The reason for this is that it is anticipated that an image forming device 10 from which the number of times image data has been acquired is larger will be more likely to have stored therein image data than an image forming device 10 from which the number of times image data has been acquired is comparatively smaller.

Each of the image forming devices 10 may be a printer designed to form an image using any method other than the electrophotographic method. Each of the image forming devices 10 may have at least one of the copying function, the scanning function, and the facsimile function.

Figure 3:
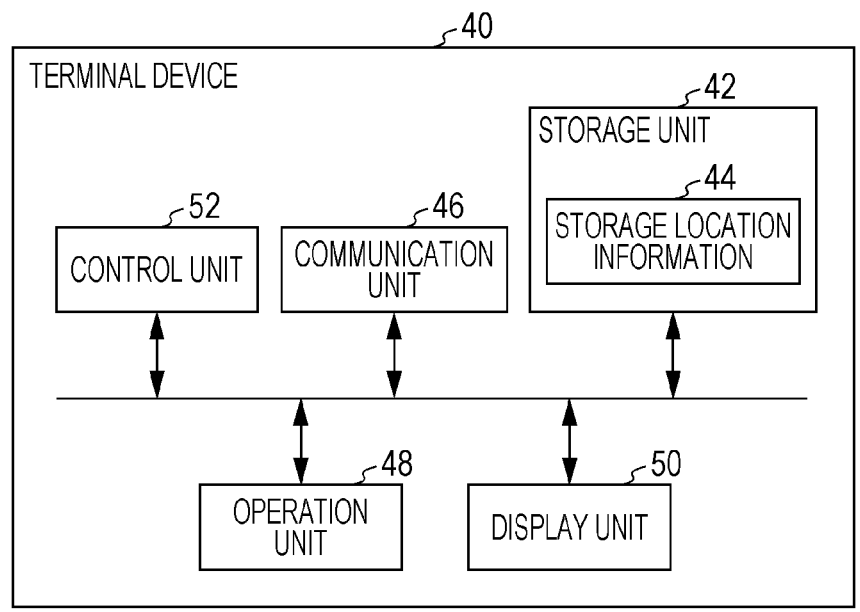
FIG. 3 is a block diagram illustrating a terminal device.

FIG. 3 illustrates a configuration of the terminal device 40. A storage unit 42 is a storage device such as a hard disk. The storage unit 42 stores storage location information 44. The storage unit 42 also stores a printer driver. The printer driver is a program having a function of controlling the image forming devices 10. The storage location information 44 is information indicating one of the image forming devices 10 in which image data transmitted from the terminal device 40 is to be stored. In the example of the image forming system illustrated in FIG. 1, the storage location information 44 is information indicating any one of the image forming devices 10A, 10B, 10C, and 10D. The storage location information 44 is, for example, device identification information of the image forming device 10. In another example, the storage location information 44 may be an Internet Protocol (IP) address assigned to the image forming device 10. By way of example, the storage location information 44 is device identification information of the image forming device 10C. The storage location information 44 may be changed by a user.

A communication unit 46 is a communication interface to be connected to the communication path N. The communication unit 46 has a function of receiving data from another device, and a function of transmitting data to another device. For example, the communication unit 46 has a function of transmitting image data designated by a user and its relevant information to one of the image forming devices 10 indicated by the storage location information 44.

An operation unit 48 is an input device such as a keyboard and a mouse. A display unit 50 is a display device such as a liquid crystal display. A control unit 52 controls the operation of each unit of the terminal device 40.

Process Overview for Image Forming System

An overview of a process performed by the image forming system will now be described. First, a user designates image data to be stored, by using the operation unit 48 of the terminal device 40, and gives instructions to store the image data. The communication unit 46 transmits the image data designated by the user and its relevant information to one of the image forming devices 10 indicated by the storage location information 44 under control of the control unit 52. By way of example, the storage location information 44 indicates the image forming device 10C. Thus, the image data and the relevant information are transmitted to the image forming device 10C.

The communication unit 14 of the image forming device 10C receives the image data and relevant information transmitted from the terminal device 40. Then, the control unit 28 causes the received image data and relevant information to be stored in the storage unit 16.

After giving instructions for storage, the user moves to one of the image forming devices 10A, 10B, 10C, and 10D. For example, the user may move to a desired one of the image forming device 10 that they frequently use, or may move to another of the image forming devices 10 if the desired image forming device 10 is currently in use. Alternatively, the user may move to one of the image forming devices 10 that is the nearest to them. Here, it is assumed that the user has moved to the image forming device 10A illustrated in FIG. 1.

When the user inputs their user identification information and PIN information to the image forming device 10A, the acquisition unit 30 of the image forming device 10A refers to the device list 18 and the priority information 22, and accesses the image forming devices 10 included in the device list 18 in order according to the priorities. Then, the acquisition unit 30 acquires relevant information of the image data associated with the user identification information from the image forming device 10 to be accessed. The display control unit 32 of the image forming device 10A causes a list of pieces of relevant information acquired by the acquisition unit 30 to be displayed on the display unit of the UI unit 24. When the user selects image data from the list, the acquisition unit 30 acquires the selected image data from one of the image forming devices 10 in which the selected image data is stored. For example, if image data stored in the image forming device 10C has been selected, the acquisition unit 30 acquires the selected image data from the image forming device 10C. The image forming unit 12 forms an image that is based on the image data on a sheet of paper.

As described above, each of the image forming devices 10 has a function of acquiring image data stored in another image forming device 10 and forming an image. This may eliminate the need for the user to store image data in an image forming device 10 that actually performs printing. Once image data is stored in one of the multiple image forming devices 10 included in the image forming system, the printing operation is performed by one of the image forming devices 10.

Specific Example of Device List 18

Figure 4:
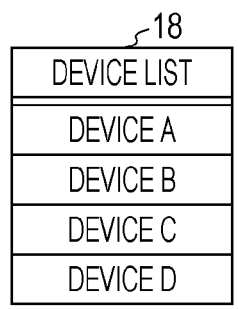
FIG. 4 illustrates an example of a device list.

Next, a specific example of the device list 18 will be described with reference to FIG. 4. The device list 18 is stored in the storage unit 16 in each of the image forming devices 10.

The device list 18 includes device identification information of all the image forming devices 10 included in the image forming system. For example, "Device A" represents device identification information of the image forming device 10A. "Device B" represents device identification information of the image forming device 10B. "Device C" represents device identification information of the image forming device 10C. "Device D" represents device identification information of the image forming device 10D. The device list 18 is created by, for example, an administrator. If a new image forming device 10 is connected to the communication path N, the control unit 28 of each of the image forming devices 10 may detect the newly connected image forming device 10. In this case, the control unit 28 adds device identification information of the newly connected image forming device 10 to the device list 18.

Specific Example of Storage History Information

Next, a specific example of the storage history information will be described with reference to FIG. 5. The storage history information illustrated in FIG. 5 is storage history information stored in the storage unit 16 of the image forming device 10A. The storage history information includes image identification information of image data stored in the image forming device 10A, information indicating the date and time at which the image data was stored in the image forming device 10A, and user identification information (e.g., a user ID) of a user who stored the image data in the image forming device 10A. The image identification information, the date and time, and the user ID are associated with one another. For example, the user with the user ID "user001" stored image data D1 in the image forming device 10A at 10:00 am on Jul. 14, 2014. The storage history information is created by the history management unit 34 of the image forming device 10A. When the image data and the relevant information are transmitted from the terminal device 40 to the image forming device 10A and are stored in the storage unit 16, the history management unit 34 of the image forming device 10A manages a history of storing the image data and the relevant information.

The storage unit 16 of each of the image forming device 10B to 10D also stores storage history information indicating, in association with one another, image identification information of image data stored in the corresponding one of the image forming devices 10, information indicating the date and time at which the image data was stored in the corresponding one of the image forming devices 10, and user identification information of a user who stored the image data in the corresponding one of the image forming devices 10. The storage history information on each of the image forming devices 10 is created by the history management unit 34 of the corresponding one of the image forming devices 10.

FIG. 6 illustrates the number of storage operations of image data to the image forming device 10A. The number of storage operations represents the number of times each user has stored image data in the image forming device 10A. The history management unit 34 of the image forming devices 10A refers to the storage history information illustrated in FIG. 5, and counts the number of storage operations for each user. For example, the number of storage operations "10" is associated with the user ID "user001". This means that the user with the user ID "user001" has stored image data in the image forming device 10A ten times. Further, the number of storage operations "8" is associated with the user ID "user002". This means that the user with the user ID "user002" has stored image data in the image forming device 10A eight times. The same applies to the other numbers of storage operations. Information indicating the numbers of storage operations is stored in the storage unit 16 of the image forming device 10A. Also in each of the image forming devices 10B to 10D, the number of storage operations is counted for each user, and information indicating the numbers of storage operations is stored in the storage unit 16. In the manner described above, the history management unit 34 of each of the image forming devices 10 counts, for each user, the number of storage operations of image data to the corresponding one of the image forming devices 10.

The history management unit 34 may count the numbers of storage operations performed by each user without creating the storage history information illustrated in FIG. 5.

Information indicating the number of storage operations for each of the image forming devices 10 by each user is shared with the other image forming devices 10. For example, the communication unit 14 of each of the image forming devices 10 transmits information indicating the number of storage operations for the corresponding one of the image forming devices 10 by each user to the other image forming devices 10. The history management unit 34 of each of the image forming devices 10 creates information indicating the number of storage operations for each of the image forming devices 10 by each user. Specifically, the communication unit 14 of the image forming device 10A transmits information indicating the number of storage operations for the image forming device 10A by each user to the image forming devices 10B to 10D. The image forming devices 10B to 10D also perform a similar operation. The history management unit 34 of the image forming device 10A creates information indicating the number of storage operations for each of the image forming devices 10A to 10D by each user. The image forming devices 10B to 10D also perform a similar operation. The history management unit 34 determines, for each user, the priorities of access to the image forming devices 10 in accordance with the numbers of storage operations for the image forming devices 10 by each user, and creates priority information 22.

Figure 7:
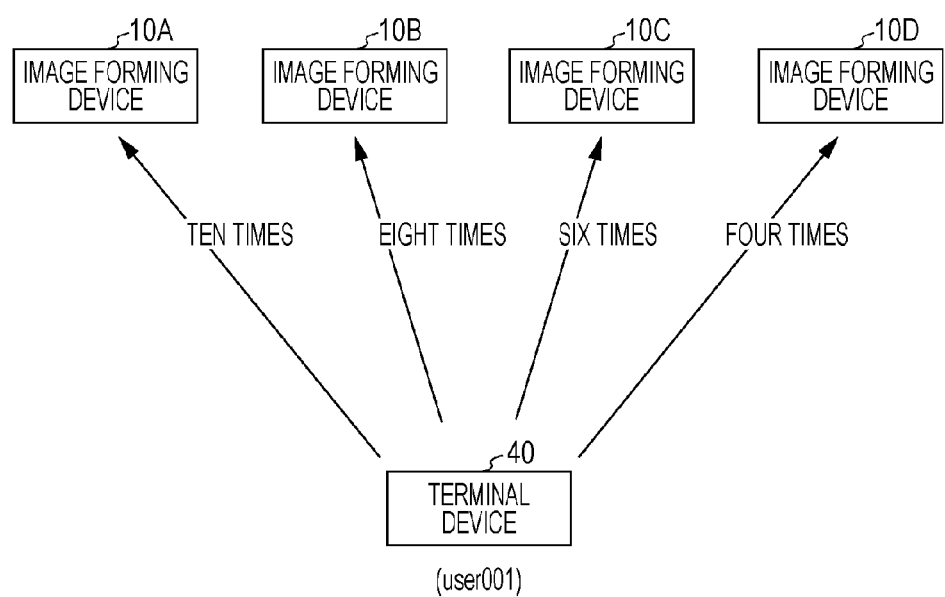
FIG. 7 depicts the numbers of storage operations.

A specific example of the number of storage operations will now be described with reference to FIG. 7 and FIG. 8. It is assumed that image data has been transmitted from the terminal device 40 to the image forming devices 10A to 10D in the manner illustrated in FIG. 7. The user ID is "user001". In the illustrated example, the number of storage operations of image data to the image forming device 10A is ten, the number of storage operations of image data to the image forming device 10B is eight, the number of storage operations of image data to the image forming device 10C is six, and the number of storage operations of image data to the image forming device 10D is four.

In this case, the numbers of storage operations performed by the user with the user ID "user001" are counted by the history management unit 34 of the image forming device 10A. Information indicating the number of storage operations ("10") is stored in the storage unit 16 of the image forming device 10A in association with the user ID "user001". The image forming device 10B to 10D performs a similar operation. The number of storage operations ("8") performed by the user with the user ID "user001" is counted by the history management unit 34 of the image forming device 10B, and information indicating the number of storage operations ("8") is stored in the storage unit 16 of the image forming device 10B in association with the user ID "user001". Further, the number of storage operations ("6") performed by the user with the user ID "user001" is counted by the history management unit 34 of the image forming device 10C, and information indicating the number of storage operations ("6") is stored in the storage unit 16 of the image forming device 10C in association with the user ID "user001". Further, the number of storage operations ("4") performed by the user with the user ID "user001" is counted by the history management unit 34 of the image forming device 10D, and information indicating the number of storage operations ("4") is stored in the storage unit 16 of the image forming device 10D in association with the user ID "user001".

Figure 8:
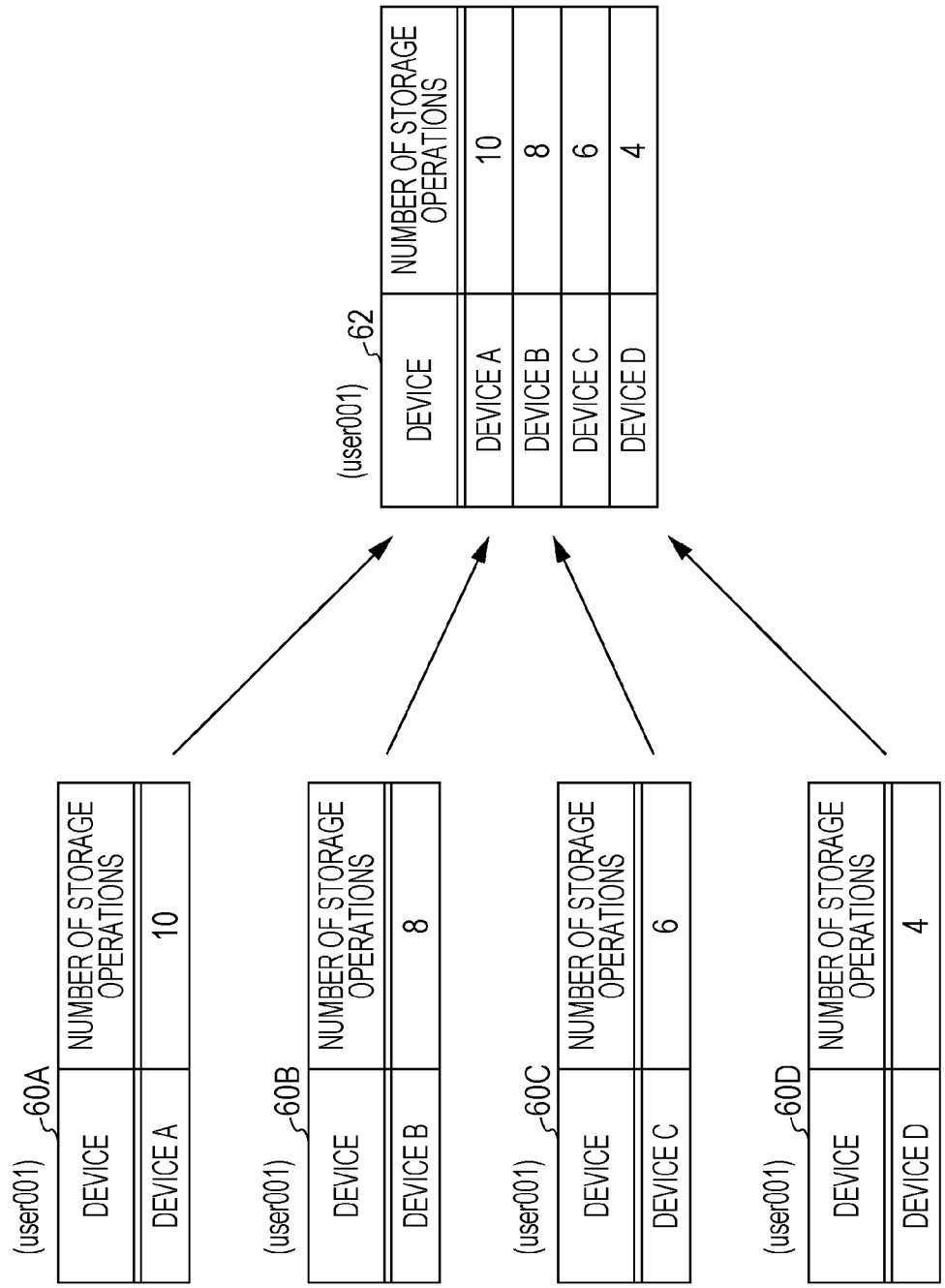
FIG. 8 illustrates an example of the numbers of storage operations.

FIG. 8 illustrates the numbers of storage operations for the image forming devices 10A to 10D. The illustrated numbers of storage operations represent the numbers of storage operations performed by the user with the user ID "user001". Individual number-of-storage-operation information 60A indicates the number of storage operations for the image forming device 10A. Individual number-of-storage-operation information 60B indicates the number of storage operations for the image forming device 10B. Individual number-of-storage-operation information 60C indicates the number of storage operations for the image forming device 10C. Individual number-of-storage-operation information 60D indicates the number of storage operations for the image forming device 10D.

The individual number-of-storage-operation information 60A, the individual number-of-storage-operation information 60B, the individual number-of-storage-operation information 60C, and the individual number-of-storage-operation information 60D are shared by the image forming devices 10A to 10D. For example, the communication unit 14 of the image forming device 10A transmits the individual number-of-storage-operation information 60A to the image forming devices 10B to 10D. The communication unit 14 of the image forming device 10B transmits the individual number-of-storage-operation information 60B to the image forming devices 10A, 10C, and 10D. The communication unit 14 of the image forming device 10C transmits the individual number-of-storage-operation information 60C to the image forming devices 10A, 10B, and 10D. The communication unit 14 of the image forming devices 10D transmits the individual number-of-storage-operation information 60D to the image forming devices 10A to 10C. The history management unit 34 of each of the image forming devices 10A to 10D combines the individual number-of-storage-operation information 60A, the individual number-of-storage-operation information 60B, the individual number-of-storage-operation information 60C, and the individual number-of-storage-operation information 60D to create overall number-of-storage-operation information 62. The overall number-of-storage-operation information 62 indicates the numbers of times the user with the user ID "user001" has stored image data in all the image forming devices 10A to 10D. The overall number-of-storage-operation information 62 is stored in the storage unit 16 of each of the image forming devices 10A to 10D. Overall number-of-storage-operation information for the other users is also created in a similar way to that for the overall number-of-storage-operation information 62, and is stored in the storage unit 16 of each of the image forming devices 10A to 10D. Accordingly, the storage unit 16 of each of the image forming devices 10A to 10D stores the overall number-of-storage-operation information for every user. One of the image forming devices 10A to 10D may combine the individual number-of-storage-operation information 60A, the individual number-of-storage-operation information 60B, the individual number-of-storage-operation information 60C, and the individual number-of-storage-operation information 60D to create overall number-of-storage-operation information 62, and may transmit the overall number-of-storage-operation information 62 to the other image forming devices 10.

The history management unit 34 determines the priorities for the user with the user ID "user001" in accordance with the overall number-of-storage-operation information 62. The priority information 22 is information indicating the priorities.

FIG. 9 illustrates priorities determined in accordance with the numbers of storage operations. The priority information 22 illustrated in FIG. 9 is priority information for the user with the user ID "user001". For example, a higher priority is set to an image forming device 10 with a larger number of storage operations. In the example illustrated in FIG. 9, the image forming device 10A has the highest priority, the image forming device 10B has the second highest priority, the image forming device 10C has the third highest priority, and the image forming device 10D has the fourth highest priority. The priorities described above are priorities for the user with the user ID "use001", and are used as common priorities of the image forming devices 10A to 10D. When the user ID "user001" is input to any of the image forming devices 10 to acquire image data, the acquisition unit 30 accesses the image forming devices 10 in order according to the priorities.

The numbers of storage operations for the image forming devices 10A to 10D are also counted for the other users, and priorities are determined in accordance with the numbers of storage operations to create priority information. The priority information for each user is stored in the storage unit 16 of each of the image forming devices 10A to 10D.

The history management unit 34 of each of the image forming devices 10 updates the storage history information each time image data is stored, counts the number of storage operations, and updates the priorities in accordance with the result of counting.

Specific Example of Acquisition History Information

Next, a specific example of the acquisition history information will be described with reference to FIG. 10. The acquisition history information illustrated in FIG. 10 is acquisition history information stored in the storage unit 16 of the image forming device 10A. The acquisition history information includes device identification information of the image forming devices 10A to 10D from which image data has been acquired by the image forming device 10A, information indicating the date and time at which the image data was acquired by the image forming device 10A, and user identification information (e.g., a user ID) of a user who has acquired image data using the image forming device 10A. The device identification information, the date and time, and the user ID are associated with one another. For example, using the image forming device 10A, the user with the user ID "user001" acquired image data from the image forming device 10B at 10:00 am on Jul. 14, 2014. The acquisition history information is created by the history management unit 34 of the image forming device 10A. When the image data is acquired by the image forming devices 10A, the history management unit 34 of the image forming device 10A manages a history of acquiring the image data.

The storage unit 16 of each of the image forming devices 10B to 10D also stores acquisition history information indicating, in association with one another, device identification information of an image forming device 10 from which image data has been acquired by the corresponding one of the image forming devices 10, information indicating the date and time at which the image data was acquired by the corresponding one of the image forming devices 10, and user identification information of a user who has acquired the image data using the corresponding one of the image forming devices 10. The acquisition history information on each of the image forming devices 10 is created by the history management unit 34 of the corresponding one of the image forming devices 10.

Figure 11:
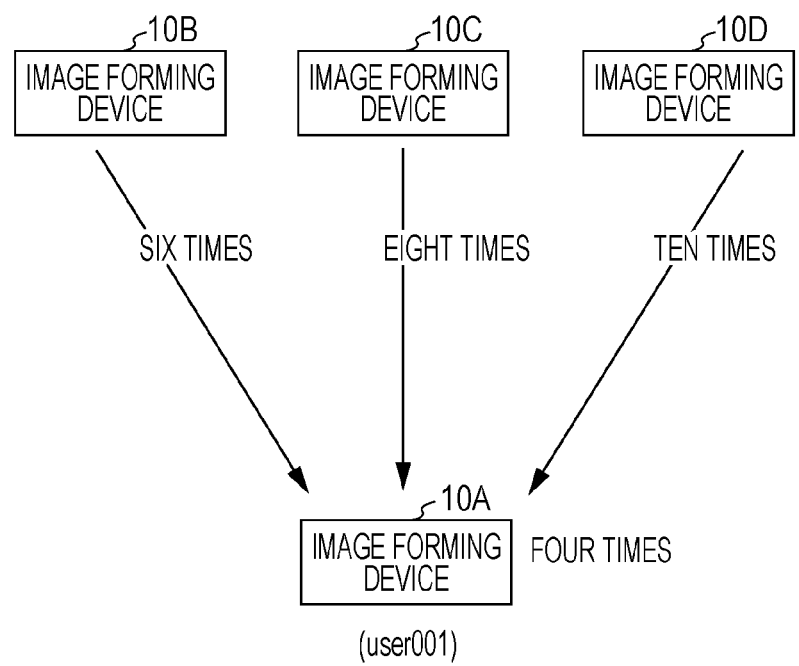
FIG. 11 depicts the numbers of acquisition operations.

A specific example of the number of acquisition operations will now be described with reference to FIG. 11. It is assumed that, for example, the image forming device 10A acquires image data in the manner illustrated in FIG. 11. It is also assumed that the user ID is "user001". In the illustrated example, the number of times image data has been acquired from the image forming device 10A is four, the number of times image data has been acquired from the image forming device 10B is six, the number of times image data has been acquired from the image forming device 10C is eight, and the number of times image data has been acquired from the image forming device 10D is ten.

In this case, the numbers of acquisition operations performed by the user with the user ID "user001" are counted by the history management unit 34 of the image forming device 10A. Information indicating the numbers of times image data has been acquired from the image forming devices 10A to 10D is stored in the storage unit 16 of the image forming device 10A in association with the user ID "user001".

FIG. 12 illustrates the numbers of times image data has been acquired by using the image forming device 10A. The illustrated numbers of acquisition operations represent the numbers of times image data has been acquired by the user with the user ID "user001". The history management unit 34 of the image forming devices 10A refers to the acquisition history information illustrated in FIG. 10, and counts the numbers of acquisition operations performed by each user. For example, the device A is associated with the number of acquisition operations "4". This means that the image forming device 10A has acquired image data from itself, or the image forming device 10A, four times. The device B is associated with the number of acquisition operations "6". This means that the image forming device 10A has acquired image data from the image forming device 10B six times. The same applies to the other numbers of acquisition operations. Information indicating the numbers of acquisition operations is stored in the storage unit 16 of the image forming device 10A. Information indicating the numbers of acquisition operations for the other users is also stored in the storage unit 16 of the image forming device 10A. Also in each of the image forming devices 10B to 10D, the number of acquisition operations performed by each user is counted, and information indicating the numbers of acquisition operations is stored in the associated storage unit 16. In the manner described above, the history management unit 34 of each of the image forming devices 10 counts, for each user, the number of times image data has been acquired by using the corresponding one of the image forming devices 10.

The history management unit 34 may count the numbers of acquisition operations performed by each user without creating the acquisition history information illustrated in FIG. 10.

The history management unit 34 determines the priorities for each user in accordance with the numbers of acquisition operations performed by each user. The priority information 22 is information indicating the priorities.

FIG. 13 illustrates priorities determined in accordance with the numbers of acquisition operations. The priority information 22 illustrated in FIG. 13 is priority information on the image forming device 10A, and is priority information for the user with the user ID "user001". For example, a higher priority is set to an image forming device with a larger number of acquisition operations. In the example illustrated in FIG. 13, the image forming device 10D has the highest priority, the image forming device 10C has the second highest priority, the image forming device 10B has the third highest priority, and the image forming device 10A has the fourth highest priority. The priorities are priorities for the user with the user ID "use001", and are used as priorities dedicated to the image forming device 10A. When the user ID "user001" is input to the image forming device 10A to acquire image data, the acquisition unit 30 of the image forming device 10A accesses the image forming devices 10 in order according to the priorities.

The numbers of acquisition operations from the image forming devices 10A to 10D are also counted for the other users, and priorities are determined in accordance with the numbers of acquisition operations to create priority information. The priority information for each user is stored in the storage unit 16 of the image forming device 10A.

Each of the image forming devices 10B to 10D performs a similar operation to that for the image forming device 10A. In each of the image forming devices 10B to 10D, the number of acquisition operations performed by each user is counted. Then, priority information dedicated to each of the image forming devices 10B to 10D is created for each user, and is stored in the associated storage unit 16.

Figure 14:
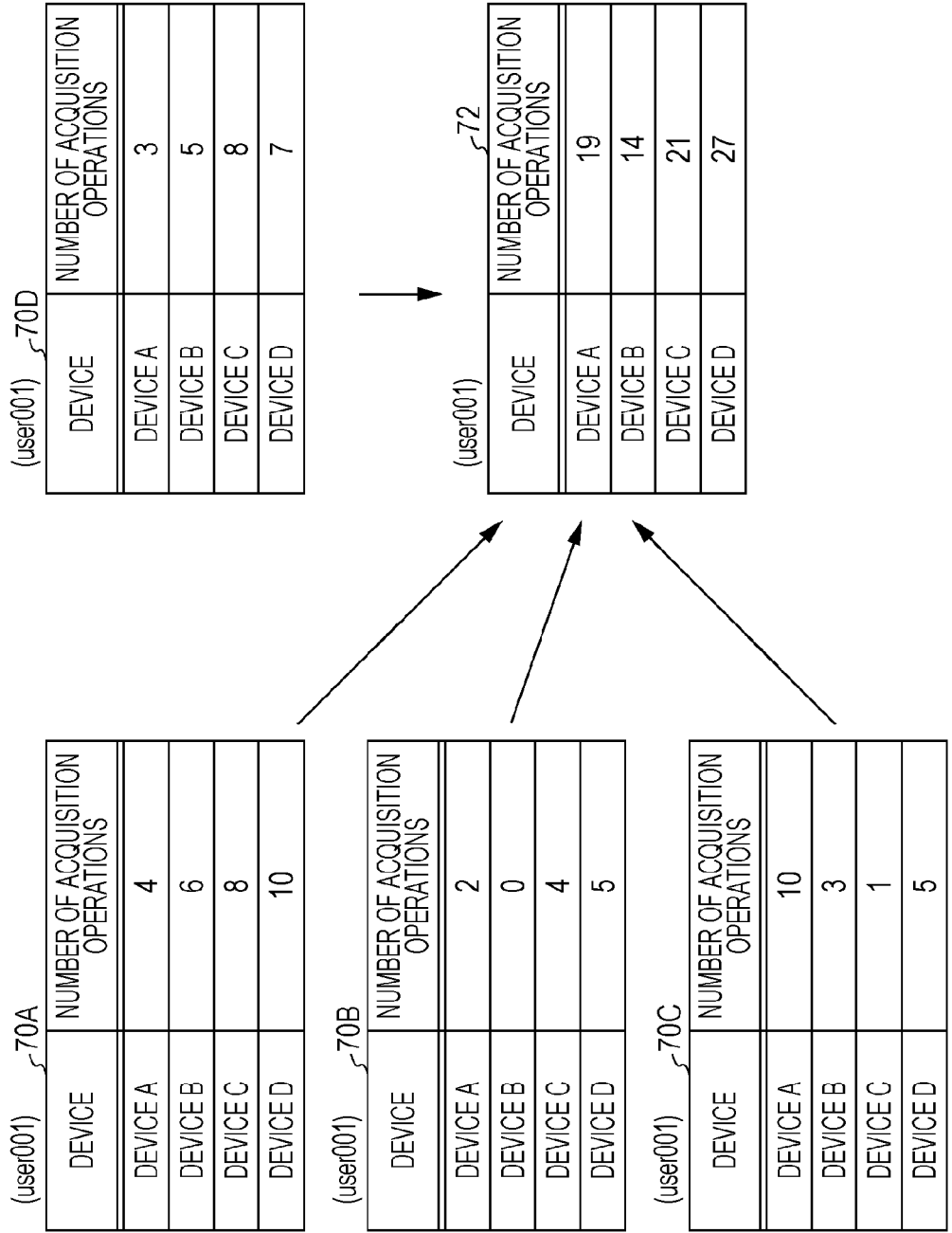
FIG. 14 illustrates an example of the numbers of acquisition operations.

The number of acquisition operations performed by each user using each of the image forming devices 10A to 10D may be shared by the image forming devices 10A to 10D. This process will be described with reference to FIG. 14. FIG. 14 illustrates the numbers of acquisition operations performed by using the image forming devices 10A to 10D. The illustrated numbers of acquisition operations represent the numbers of acquisition operations performed by the user with the user ID "user001". Individual number-of-acquisition-operation information 70A indicates the number of acquisition operations performed by using the image forming device 10A. Here, the number of acquisition operations indicated by the individual number-of-acquisition-operation information 70A is the same as the number of acquisition operations illustrated in FIG. 12. Individual number-of-acquisition-operation information 70B indicates the number of acquisition operations performed by using the image forming device 10B. Individual number-of-acquisition-operation information 70C indicates the number of acquisition operations performed by using the image forming device 10C. Individual number-of-acquisition-operation information 70D indicates the number of acquisition operations performed by using the image forming device 10D.

The individual number-of-acquisition-operation information 70A, the individual number-of-acquisition-operation information 70B, the individual number-of-acquisition-operation information 70C, and the individual number-of-acquisition-operation information 70D are shared by the image forming devices 10A to 10D. For example, the communication unit 14 of the image forming device 10A transmits the individual number-of-acquisition-operation information 70A to the image forming devices 10B to 10D. The communication unit 14 of the image forming device 10B transmits the individual number-of-acquisition-operation information 70B to the image forming devices 10A, 10C, and 10D. The communication unit 14 of the image forming device 10C transmits the individual number-of-acquisition-operation information 70C to the image forming devices 10A, 10B, and 10D. The communication unit 14 of the image forming device 10D transmits the individual number-of-acquisition-operation information 70D to the image forming devices 10A to 10C. The history management unit 34 of each of the image forming devices 10A to 10D combines the individual number-of-acquisition-operation information 70A, the individual number-of-acquisition-operation information 70B, the individual number-of-acquisition-operation information 70C, and the individual number-of-acquisition-operation information 70D to create overall number-of-acquisition-operation information 72. Specifically, the history management unit 34 calculates the sum of the numbers of acquisition operations performed by using each of the image forming devices 10. The overall number-of-acquisition-operation information 72 indicates the total number (or the sum) of times image data has been acquired from each of the image forming devices 10A to 10D by the user with the user ID "user001". The overall number-of-acquisition-operation information 72 is stored in the storage unit 16 of each of the image forming devices 10A to 10D. Overall number-of-acquisition-operation information by the other users is also created in a similar way to that for the overall number-of-acquisition-operation information 72, and is stored in the storage unit 16 of each of the image forming devices 10A to 10D. Accordingly, the storage unit 16 of each of the image forming devices 10A to 10D stores overall number-of-acquisition-operation information for each user. One of the image forming devices 10A to 10D may combine the individual number-of-acquisition-operation information 70A, the individual number-of-acquisition-operation information 70B, the individual number-of-acquisition-operation information 70C, and the individual number-of-acquisition-operation information to 70D to create overall number-of-acquisition-operation information 72, and may transmit the overall number-of-acquisition-operation information 72 to the other image forming devices 10.

The history management unit 34 determines the priorities for the user with the user ID "user001" in accordance with the overall number-of-acquisition-operation information 72. In the example illustrated in FIG. 14, the total number of times image data has been acquired from the image forming device 10A is 19, the total number of times image data has been acquired from the image forming device 10B is 14, the total number of times image data has been acquired from the image forming device 10C is 21, and the total number of times image data has been acquired from the image forming device 10D is 27. Thus, the image forming device 10D has the highest priority, the image forming device 10C has the second highest priority, the image forming device 10A has the third highest priority, and the image forming device 10B has the fourth highest priority. The priorities determined in accordance with the overall number-of-acquisition-operation information 72 are priorities for the user with the user ID "user001", and are used as priorities common to the image forming devices 10A to 10D. When the user ID "user001" is input to any of the image forming devices 10 to acquire image data, the acquisition unit 30 accesses the image forming devices 10 in order according to the priorities.

The same applies to the other users. Overall number-of-acquisition-operation information is created for each user, and priorities based on the overall number-of-acquisition-operation information are determined for each user. Priority information for each user is stored in the storage unit 16 of each of the image forming devices 10A to 10D.

The history management unit 34 of each of the image forming devices 10 updates the acquisition history information each time image data is acquired, counts the number of acquisition operations, and updates the priorities in accordance with the result of counting.

In this exemplary embodiment, at least either of the number of acquisition operations and the number of storage operations is counted. If both are counted, priorities may be determined in accordance with the number of acquisition operations or in accordance with the number of storage operations.

A process of the image forming devices 10 will now be described with reference to a specific example thereof. Here, it is assumed that image data has been transmitted from the terminal device 40 to the image forming devices 10 and image data has been stored in the image forming devices 10.

FIG. 15 illustrates a list of pieces of image data stored in each of the image forming devices 10. For example, it is assumed that the user who has transmitted the image data has the user ID "user001". It is also assumed that pieces of image data D1 to D9 associated with the user ID "user001" have been stored in the image forming devices 10. For example, the image forming device 10A has stored therein the image data D5. The image forming devices 10B has stored therein the image data D6 and the image data D7. The image forming device 10C has stored therein the image data D8 and the image data D9. The image forming devices 10D have stored therein the image data D1, the image data D2, the image data D3, and the image data D4.

FIG. 16 illustrates a priority order. The priority order may be based on information on the number of storage operations or based on information on the number of acquisition operations. It is to be understood that the priority order may be determined by a user. By way of example, the illustrated priority order is determined on the basis of the use of the image forming device 10A, and is a priority order for the user with the user ID "user001". When the user with the user ID "user001" uses the image forming device 10A, the image forming devices 10 are accessed in accordance with the priority order.

First Example

Figure 17:
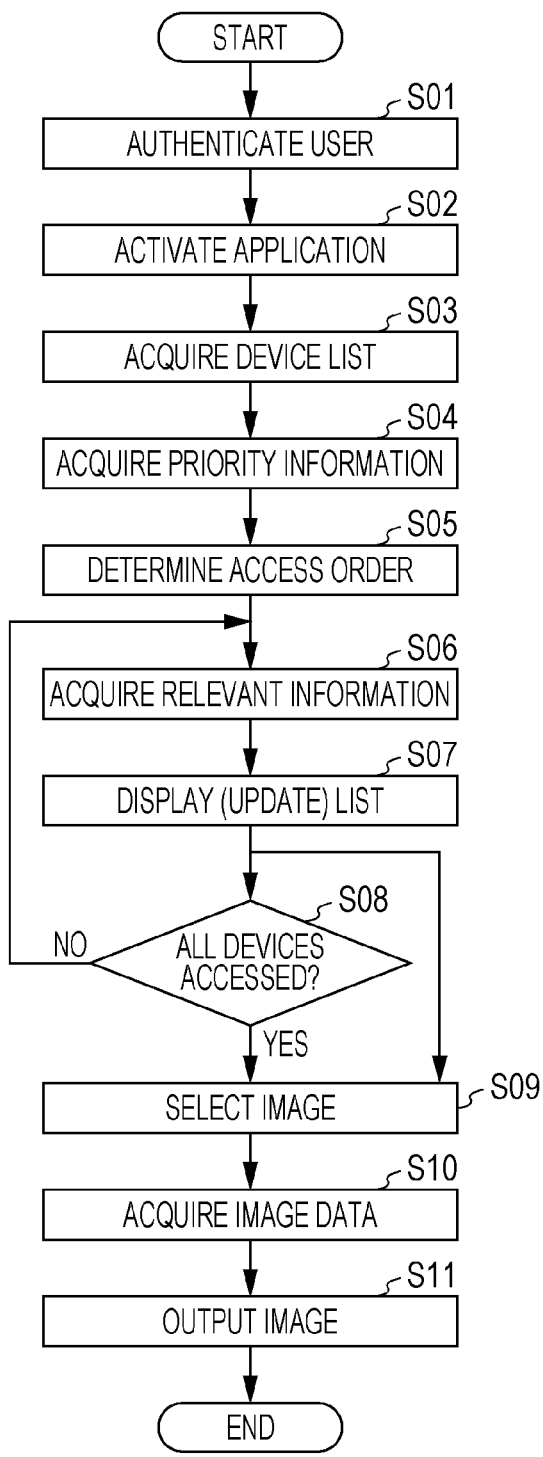
FIG. 17 is a flowchart illustrating an example of a process according to a first example.

A first example will be described with reference to a flowchart illustrated in FIG. 17. Here, it is assumed that a user uses the image forming device 10A to print image data. First, user authentication is performed (S01). To that end, the user inputs their user identification information and PIN information to the image forming device 10A by using the operation unit of the UI unit 24 or by using the card reading unit 26. When these pieces of information are input, in the image forming device 10A, the control unit 28 checks the input user identification information and PIN information against the user identification information and PIN information included in the authentication information stored in the storage unit 16. If both pieces of information match, authentication is successful, whereas, if both pieces of information do not match, authentication has failed. If authentication has failed, the process ends. If authentication is successful, the process proceeds to step S02. The authentication process may be executed by an authentication server. In this case, the authentication information is stored in the authentication server. When user identification information and PIN information are input to the image forming devices 10A, the input pieces of information are transmitted to the authentication server. The authentication server performs an authentication process, and transmits an authentication result to the image forming device 10A.

After authentication has succeeded, the user activates the desired application (S02). Here, an application for printing image data stored in the image forming devices 10A to 10D is activated.

Then, the control unit 28 of the image forming device 10A acquires the device list 18 stored in the storage unit 16 (S03). The control unit 28 further acquires the priority information 22 stored in the storage unit 16 (S04). Here, it is assumed that the priority information illustrated in FIG. 16 is acquired. The control unit 28 determines the order of access in accordance with the priorities indicated by the priority information (S05). In the example illustrated in FIG. 16, the image forming device 10D is in the first position, the image forming device 10A is in the second position, the image forming device 10B is in the third position, and the image forming device 10C is in the fourth position.

The acquisition unit 30 of the image forming devices 10A accesses the image forming devices 10 in accordance with the order of access (i.e., the order of priorities) under control of the control unit 28, and acquires relevant information of image data (S06). When the relevant information is acquired by the acquisition unit 30, the display control unit 32 of the image forming device 10A causes the acquired relevant information to be displayed on the display unit of the UI unit 24 (S07). The acquisition unit 30 may acquire the relevant information after the user has given instructions to acquire the relevant information by using the operation unit of the UI unit 24.

The processing of steps S06 and S07 will be described with reference to a specific example thereof. Since the image forming device 10D is in the first position, the acquisition unit 30 of the image forming device 10A accesses the image forming device 10D. If the image forming device 10D has stored therein image data associated with the user ID "user001", the acquisition unit 30 acquires relevant information of the image data from the image forming device 10D (S06). In the example illustrated in FIG. 15, since the image forming device 10D has stored therein the image data D1 to D4, the acquisition unit 30 of the image forming device 10A acquires relevant information of each of the image data D1 to D4. Then, the display control unit 32 of the image forming device 10A causes the relevant information of each of the image data D1 to D4 to be displayed on the display unit of the UI unit 24 (S07). In the manner described above, upon search and acquisition of relevant information, the display control unit 32 causes the relevant information to be displayed on the display unit.

Figure 18:
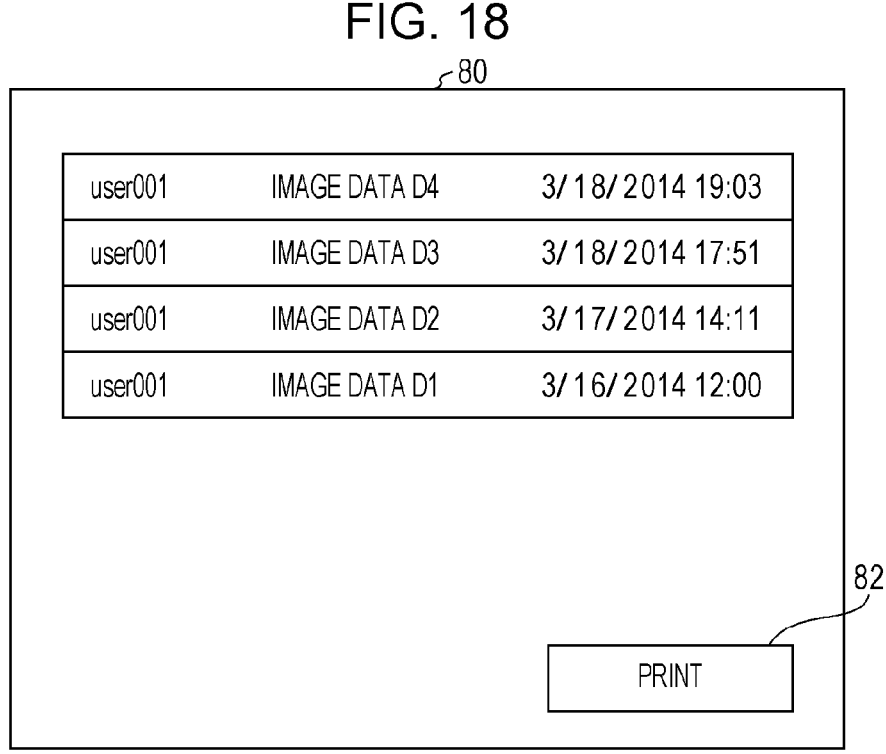
FIG. 18 illustrates an example of a screen of a display unit.

FIG. 18 illustrates an example display. Pieces of relevant information of the image data D1 to D4 are displayed in list form (or as a list) on a screen 80 of the display unit. Specifically, the user ID, the image identification information, and the creation date and time are displayed. For example, the display control unit 32 causes the pieces of relevant information to be displayed on the display unit in chronological order according to the creation date and time. In the example illustrated in FIG. 18, a piece of relevant information of image data having a more recent creation date and time is displayed closer to the top of the list on the screen 80, and information having an older creation date and time is displayed closer to the bottom of the list on the screen 80. Display order may be reversed.

At this time, when the user uses the operation unit of the UI unit 24 to select the image data to be printed from the list of pieces of relevant information displayed on the display unit (S09), the acquisition unit 30 of the image forming device 10A acquires the selected image data (S10). For example, if the image data D1 is selected from the list illustrated in FIG. 18, the acquisition unit 30 accesses the image forming device 10D, and acquires the image data D1 from the image forming device 10D. Then, when the user gives instructions for printing, the image forming unit 12 of the image forming device 10A forms an image that is based on the image data D1 on a sheet of paper (S11). For example, the screen 80 has a Print button 82. By pressing the Print button 82, the user gives instructions for printing. When the Print button 82 is pressed, the acquisition unit 30 may acquire the image data D1, and then the image forming unit 12 may form an image that is based on the image data D1 on a sheet of paper.

Then, when the acquisition unit 30 accesses all the image forming devices 10 (i.e., the image forming devices 10A to 10D) (YES in S08), the acquisition process of relevant information is completed, and the process proceeds to step S09. In this case, the processing of steps S09 to S11 described above is performed.

If not all the image forming devices 10 have been accessed (NO in S08), the acquisition process of relevant information is not completed, and the process returns to step S06. In this case, the acquisition unit 30 accesses the image forming device 10 in the next position. In the example illustrated in FIG. 16, the image forming device 10A is in the second position. Thus, the acquisition unit 30 of the image forming device 10A accesses the storage unit 16 of the image forming device 10A. If the storage unit 16 has stored therein image data associated with the user ID "user001", the acquisition unit 30 acquires relevant information of the image data from the storage unit 16 of the image forming device 10A (S06). In the example illustrated in FIG. 15, the image forming device 10A has stored therein the image data D5. Thus, the acquisition unit 30 of the image forming device 10A acquires relevant information of the image data D5. Then, the display control unit 32 of the image forming device 10A causes the relevant information of the image data D5 to be displayed on the display unit of the UI unit 24 (S07).

The display control unit 32 updates the information being displayed on the display unit each time new relevant information is acquired. Specifically, the display control unit 32 combines the relevant information that has already been acquired and the relevant information has newly been acquired, and causes the combined information to be rearranged in chronological order according to the creation date and time of image data and to be displayed on the display unit.

Figure 19:
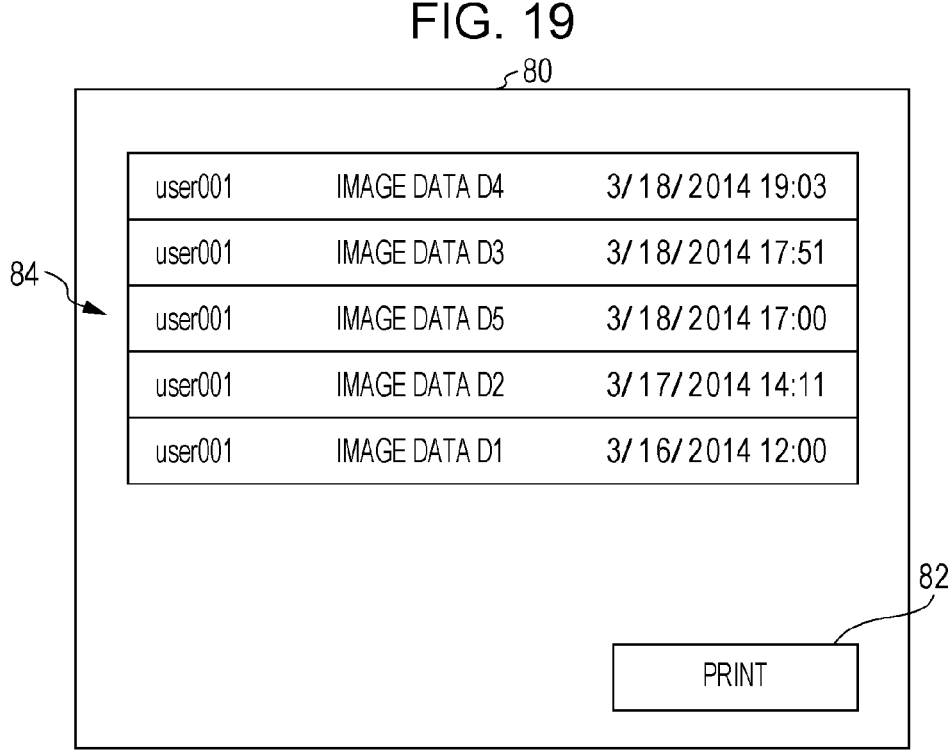
FIG. 19 illustrates an example of a screen of the display unit.

FIG. 19 illustrates an example display after the update. On the screen 80 of the display unit, the relevant information of the image data D1 to D4, which have already been acquired, and the relevant information of the image data D5, which has been newly acquired, are displayed in list form. In this case, the pieces of relevant information of the image data D1 to D5 are displayed in chronological order according to the creation date and time of image data. Here, it is assumed that the creation date and time of the image data D5 lies between the creation date and time of the image data D2 and the creation date and time of the image data D3. In this case, as indicated by reference numeral 84, the relevant information of the image data D5, which has been acquired later, is displayed between the relevant information of the image data D2 and the relevant information of the image data D3. At this time, when the user designates the image data to be printed, the acquisition unit 30 acquires the selected image data, and the image forming unit 12 forms an image that is based on the image data on a sheet of paper.

The pieces of relevant information may be displayed on the display unit in the order in which the pieces of relevant information were acquired by the acquisition unit 30, in the order of the names of the image data, or in the order of the storage dates and times of the image data. Alternatively, the user may change the order of arrangement of the pieces of relevant information, as desired, by using the operation unit of the UI unit 24.

If not all the image forming devices 10 have been accessed (NO in S08), the process returns to step S06. In this case, the acquisition unit 30 accesses the image forming devices 10 in accordance with the priorities. In the example illustrated in FIG. 16, the acquisition unit 30 accesses the image forming devices 10B and 10C in this order. Then, the display control unit 32 updates the information being displayed on the display unit each time new relevant information is acquired.

If all the image forming devices 10 have been accessed (YES in S08), the process proceeds to step S09, and the processing of steps S09 to S11 described above is performed.

In the manner described above, in the first example, the acquisition unit 30 accesses the image forming devices 10 in order according to the priorities, and acquires relevant information. Access to the image forming devices 10 in accordance with the priorities results in access to the image forming devices 10 in order starting with the image forming device 10 in which the image data is most likely to be stored. Accordingly, relevant information may be acquired preferentially from an image forming device 10 in which the image data is relatively more likely to be stored. In addition, upon acquisition of relevant information, the display control unit 32 causes the acquired relevant information to be displayed on the display unit to update the information being displayed on the display unit. In the first example, accordingly, the relevant information of the target image data (for example, the image data to be printed) is acquired earlier than in the case where relevant information is acquired through access to all the image forming devices 10A to 10D and then the acquired relevant information is displayed. That is, the time period required from the activation of an application to the display of the relevant information of the target image data, that is, the waiting time period taken to display the relevant information, may be reduced. For example, access to the image forming devices 10 in accordance with the priorities for each user allows relevant information of image data that the user may be allowed to use to be acquired and displayed earlier. In the following description, the process for acquiring relevant information through access to all the image forming devices 10A to 10D and then displaying the acquired relevant information is referred to as the "process according to the comparative example".

For example, if priorities based on the numbers of storage operations are used, an image forming device 10 in which the number of times image data has been actually stored is large is accessed preferentially. Accordingly, an image forming device 10 in which image data is relatively more likely to be stored is accessed preferentially. Thus, the target image data may be searched and relevant information of the image data may be acquired and displayed earlier than in the process according to the comparative example.

If priorities based on the numbers of acquisition operations are used, an image forming device 10 from which the number of times image data has been actually acquired is large is accessed preferentially. Accordingly, an image forming device 10 in which image data is relatively more likely to be stored is accessed preferentially. Thus, the target image data may be searched and relevant information of the image data may be acquired and displayed earlier than in the process according to the comparative example.

Second Example

A second example will now be described. In the first example described above, the image forming devices 10 are automatically accessed in accordance with the priorities, and, upon detection of new relevant information, the relevant information is sequentially displayed on the display unit, and the information being displayed on the display unit is automatically updated. That is, acquisition of relevant information and update of display are automatically performed. In this case, as illustrated in FIG. 19, when new relevant information is acquired, the new relevant information may be displayed between multiple pieces of relevant information that have already been acquired depending on the creation date and time of the image data. As a result, the pieces of relevant information that have already been acquired are reordered. This may cause the following issues.

Consideration will be given to the case where, for example, while relevant information acquired from the image forming device 10D (e.g., the relevant information of the image data D1 to D4) is being displayed in the manner illustrated in FIG. 18, a user is to select image data (for example, the image data D2). In this case, relevant information may be acquired from the image forming device 10A before the user selects the image data, depending on the timing of the selection of the image data and the timing of access to the image forming device 10A having the next priority. In this case, the display content is updated in the manner illustrated in FIG. 19, and the display position of the image data D2 that the user is to select is shifted down. Shifting the display position in this way may make it difficult for the user to select the image data. For example, in a case where the display unit of the UI unit 24 is formed of a touch panel, the position to be touched on the touch panel will be shifted, resulting in an item being difficult to select. If the update of display occurs immediately before selection is made, image data which is not intended by the user may be erroneously selected.

Figure 20:
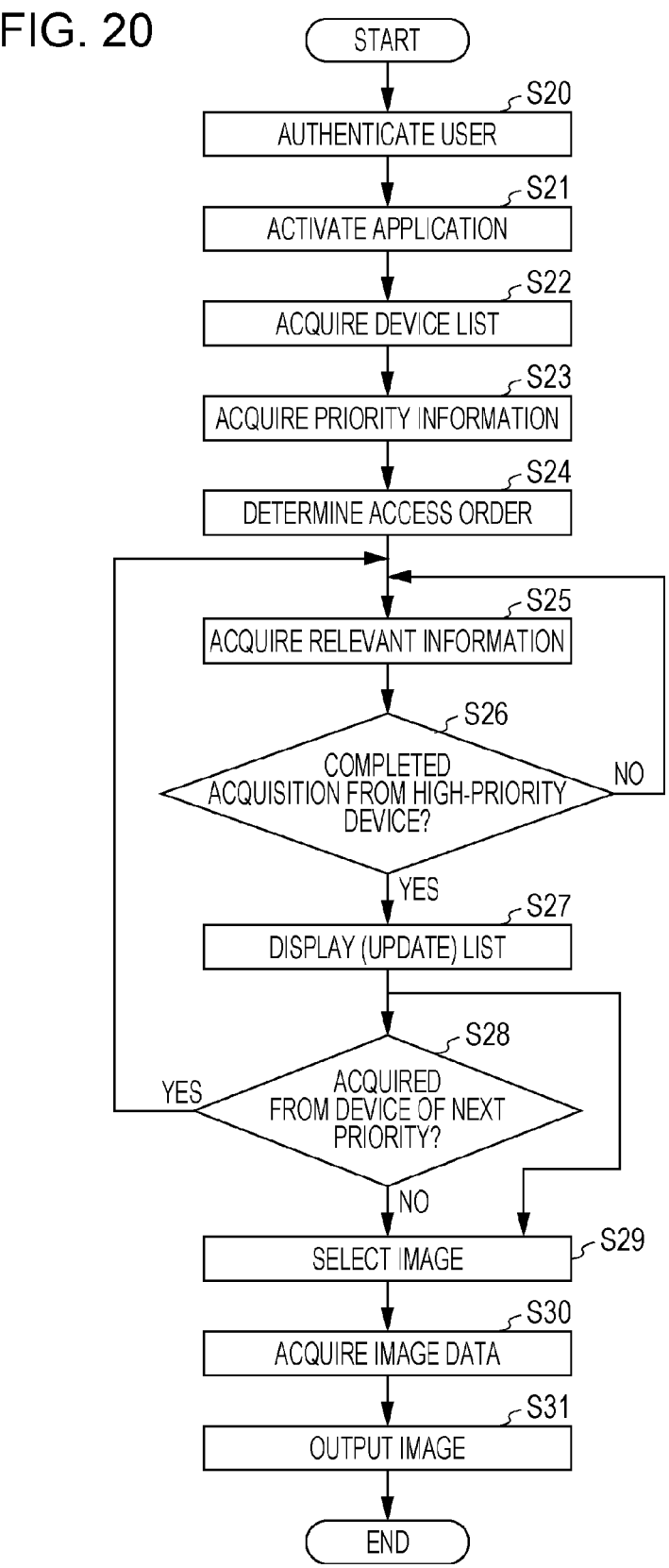
FIG. 20 is a flowchart illustrating an example of a process according to a second example.

To address the foregoing issue, in the second example, the acquisition of relevant information and the update of display are performed in accordance with instructions from the user instead of the acquisition of relevant information and the update of display being automatically performed. A process according to the second example will be described with reference to a flowchart illustrated in FIG. 20.

By way of example, it is assumed that the user uses the image forming device 10A to print image data. The processing of steps S20 to S25 is substantially the same as the processing of steps S01 to S06 described above. First, user authentication is performed (S20). If authentication has failed, the process ends. If authentication is successful, the user activates the desired application (S21). Here, an application for printing image data stored in the image forming devices 10A to 10D is activated. Then, the control unit 28 of the image forming device 10A acquires the device list 18 (S22), and acquires the priority information 22 (S23). Here, it is assumed that the priority information illustrated in FIG. 16 is acquired. The control unit 28 determines the order of access in accordance with the priorities indicated by the priority information (S24).

The acquisition unit 30 of the image forming devices 10A accesses the image forming devices 10 in accordance with the order of access (i.e., the order of priorities) under control of the control unit 28, and acquires relevant information of image data (S25). Since the image forming device 10D is in the first position, the acquisition unit 30 of the image forming device 10A accesses the image forming device 10D. If the image forming device 10D has stored therein image data associated with the user ID "user001", the acquisition unit 30 acquires relevant information of the image data from the image forming device 10D (S25). In the example illustrated in FIG. 15, the image forming device 10D has stored therein the image data D1 to D4, the acquisition unit 30 of the image forming device 10A acquires relevant information of each of the image data D1 to D4. If the acquisition process is not completed (NO in S26), the processing of step S25 is executed until relevant information of each of the image data D1 to D4 has been acquired.

Figure 21:
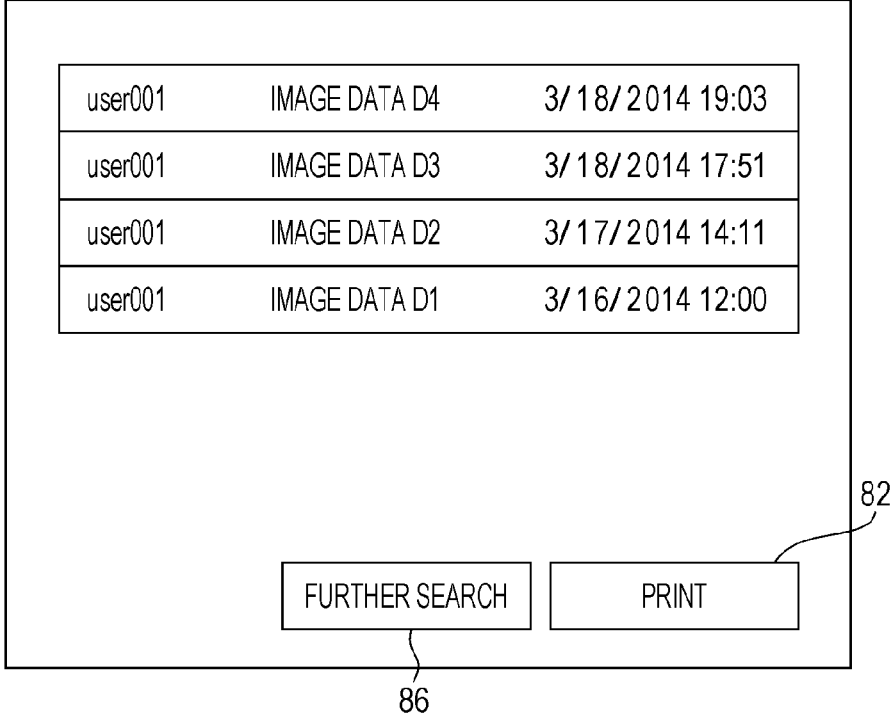
FIG. 21 illustrates an example of a screen of a display unit.

When the process for acquiring relevant information from the image forming device 10D is completed (YES in S26), the display control unit 32 causes the relevant information of each of the image data D1 to D4 to be displayed on the display unit of the UI unit 24 (S27). FIG. 21 illustrates an example display. On the screen 80 of the display unit, the pieces of relevant information of the image data D1 to D4 are displayed in list form (or as a list). For example, the display control unit 32 causes the pieces of relevant information to be displayed on the display unit in chronological order according to the creation date and time. In the example illustrated in FIG. 21, a piece of relevant information of image data having a more recent creation date and time is displayed closer to the top of the list on the screen 80, and information having an older creation date and time is displayed closer to the bottom of the list on the screen 80. Display order may be reversed.

At this time, when the user uses the operation unit of the UI unit 24 to select the image data to be printed (S29), the acquisition unit 30 of the image forming device 10A acquires the selected image data (S30), and the image forming unit 12 of the image forming device 10A forms an image that is based on the acquired image data on a sheet of paper. For example, by pressing the Print button 82, the user gives instructions for printing.

In the second example, when instructions to continue the acquisition of relevant information are given by a user, the image forming device 10 in the next position is accessed. For example, as illustrated in FIG. 21, the screen 80 has a button ("Further Search" button) 86 to give instructions to continue acquisition. When the button 86 is pressed, the acquisition process of relevant information is continued.

If instructions to continue acquisition are not given by the user (NO in S28), for example, if the button 86 is not pressed by the user, the acquired list of pieces of relevant information is displayed on the display unit, and the update of display does not occur. For example, as illustrated in FIG. 21, the relevant information acquired from the image forming device 10D having the highest priority is continuously displayed on the screen 80 of the display unit. When the user selects the image data to be printed, the image data is acquired, and an image that is based on the image data is formed on a sheet of paper.

If instructions to continue acquisition are given by the user (YES in S28), for example, if the button 86 is pressed by the user, the process returns to step S25. The acquisition unit 30 of the image forming devices 10A accesses the image forming device 10 in the next position. In the example illustrated in FIG. 16, the image forming device 10A is in the second position. Thus, the acquisition unit 30 of the image forming device 10A accesses the storage unit 16 of the image forming device 10A. If the storage unit 16 has stored therein image data associated with the user ID "user001", the acquisition unit 30 acquires relevant information of the image data from the storage unit 16 of the image forming device 10A (S25). In the example illustrated in FIG. 15, the image forming device 10A has stored therein the image data D5. Thus, the acquisition unit 30 of the image forming device 10A acquires relevant information of the image data D5.

When the process for acquiring relevant information from the storage unit 16 of the image forming device 10A is completed (YES in S26), the display control unit 32 causes the relevant information of the image data D5 to be displayed on the display unit of the UI unit 24 (S27). At this time, the display control unit 32 combines the relevant information of each of the image data D1 to D4, which have already been acquired, and the relevant information of the image data D5, which has newly been acquired, and causes the combined information to be rearranged in chronological order according to the creation date and time of image data and to be displayed on the display unit. Accordingly, the information being displayed on the display unit is updated.

Figure 22:
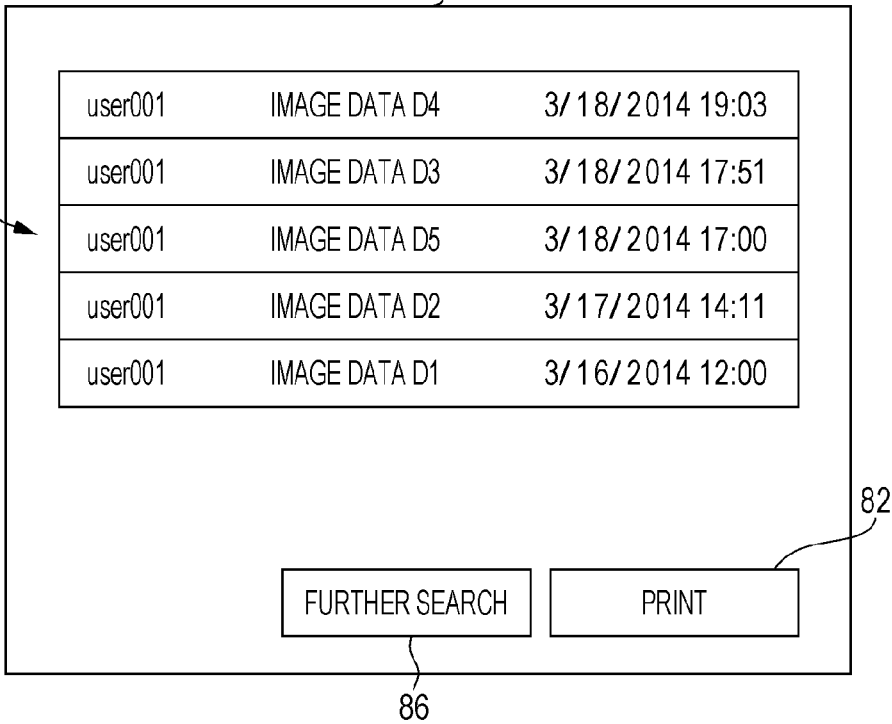
FIG. 22 illustrates an example of a screen of the display unit.

FIG. 22 illustrates an example display after the update. Similarly to the example illustrated in FIG. 19 (the first example), as indicated by reference numeral 84, the relevant information of the image data D5, which has been acquired later, is displayed between the relevant information of the image data D2 and the relevant information of the image data D3. At this time, when the user designates the image data to be printed, the acquisition unit 30 acquires the selected image data, and the image forming unit 12 forms an image that is based on the image data on a sheet of paper.

If instructions to continue acquisition are not given from the user (NO in S28), the acquired list of pieces of relevant information is displayed on the display unit, and the update of display does not occur. For example, as illustrated in FIG. 22, the relevant information acquired from the image forming device 10D having the highest priority and the relevant information acquired from the image forming device 10A having the second highest priority are continuously displayed on the screen 80 of the display unit.

If instructions to continue acquisition are given from the user (YES in S28), for example, if the button 86 is pressed by the user, the process returns to step S25. In this case, the acquisition unit 30 of the image forming device 10A accesses the image forming device 10 in the next position. In the example illustrated in FIG. 16, the acquisition unit 30 accesses the image forming device 10B. When relevant information is acquired from the image forming device 10B, the information being displayed on the display unit is updated.

The subsequent operation is performed in a similar way. When instructions to continue acquisition are given from the user, new relevant information is acquired, and information being displayed on the display unit is updated.

Similarly to the first example, the pieces of relevant information may be displayed on the display unit in the order in which the pieces of relevant information were acquired by the acquisition unit 30, in the order of the names of the image data, or in the order of the storage dates and times of the image data. Alternatively, the user may change the order of arrangement of the pieces of relevant information, as desired, by using the operation unit of the UI unit 24.

In the second example, accordingly, when instructions to continue acquisition are given from the user, new relevant information is acquired, and the list of pieces of relevant information being displayed on the display unit is updated. That is, unless instructions to continue acquisition are given from the user, the list of pieces of relevant information will not be updated, and the pieces of relevant information will not be reordered. This may prevent the occurrence of user's unintentional reordering.

In the second example described above, when instructions to continue acquisition are given from the user, the acquisition unit 30 accesses the image forming devices 10 in accordance with priorities and acquires relevant information. In another example, the acquisition unit 30 may access the image forming devices 10 in accordance with priorities and acquire relevant information even if instructions to continue acquisition are not given from the user. In this case, when instructions to continue acquisition are given from the user, the display control unit 32 combines the relevant information that has already been acquired and the relevant information that has newly been acquired, and causes the combined information to be displayed on the display unit. That is, even if instructions to continue acquisition are not given from the user, the acquisition unit 30 executes the acquisition process of relevant information in the background. At the time when instructions to continue acquisition are given, the display control unit 32 updates the list of pieces of relevant information being displayed on the display unit. Also in this case, the occurrence of user's unintentional reordering may be prevented.

In the first and second examples described above, the acquisition unit 30 accesses the image forming devices 10 one-by-one. However, this is merely an example. The acquisition unit 30 may access the image forming devices 10 in units of several image forming devices 10 in accordance with priorities. For example, in a case where the image forming devices 10 are accessed in units of two, the acquisition unit 30 accesses the image forming device 10 having the highest priority and the image forming device 10 having the second highest priority, and acquires relevant information from the two image forming devices 10. The display control unit 32 causes relevant information on the two image forming devices 10 to be displayed on the display unit. Then, the acquisition unit 30 accesses the image forming device 10 having the third highest priority and the image forming device 10 having the fourth highest priority, and acquires relevant information from the two image forming devices 10. The display control unit 32 combines the relevant information acquired from the image forming devices 10 having the highest priority through the fourth highest priority, and causes the combined relevant information to be displayed on the display unit.

In a case where the acquisition unit 30 accesses another image forming device 10, the access may not necessarily be successful due to an error such as a timeout during communication. In this case, the priority of the image forming device 10 to which access has failed may be reduced. For example, in a case where the acquisition unit 30 sends a data request to another image forming device 10, if no response is returned from the image forming device 10 after a predetermined period of time has elapsed, the priority of the image forming device 10 is reduced. The image forming device 10 is anticipated to have had a problem such as the power supply being off, a communication failure having occurred, or being temporarily disconnected from the communication path N. In this case, access to such an image forming device 10 will not allow the user to acquire relevant information or image data. Thus, the control unit 28 of each of the image forming devices 10 reduces the priority of an image forming device 10 to which access has failed. For example, the priority may be reduced by a single level, or may be reduced by multiple levels.

In the exemplary embodiment described above, the acquisition unit 30 first acquires relevant information, and then acquires image data selected by a user. In another example, the acquisition unit 30 may acquire image data without the preceding acquisition of relevant information. In this case, the display control unit 32 causes relevant information of the acquired image data to be displayed on the display unit of the UI unit 24. When the user selects image data, the image forming unit 12 forms an image that is based on the selected image data on a sheet of paper. In general, the amount of image data is larger than the amount of data of relevant information. Thus, the total time period required to transfer data when relevant information is once acquired and then image data is acquired in accordance with a user selection is shorter than that when the image data itself is acquired regardless of whether there is a user selection.

The priority information 22 may be stored in a server such as an authentication server without being stored in each of the image forming devices 10. In this case, the control unit 28 refers to the priority information 22 stored in the server to determine the order of access, and the acquisition unit 30 accesses the image forming devices 10 in accordance with the order.

Each of the image forming devices 10 described above is implemented by, by way of example, using hardware resources and software in cooperation with each other. Specifically, each of the image forming devices 10 includes a processor such as a central processing unit (CPU) (not illustrated). The processor reads and executes a program stored in a storage device (not illustrated) to implement the functions of each unit of the image forming device 10. The program is stored in the storage device via a storage medium such as a compact disc (CD) or a digital versatile disc (DVD), or via a communication path such as a network. Alternatively, each unit of each of the image forming devices 10 may also be implemented by hardware resources such as a processor and an electronic circuit. In this implementation, a device such as a memory may be used.

Further, the terminal device 40 described above is implemented by, by way of example, using hardware resources and software in cooperation with each other. Specifically, the terminal device 40 includes a processor such as a CPU (not illustrated). The processor reads and executes a program stored in a storage device (not illustrated) to implement the functions of each unit of the terminal device 40. The program is stored in the storage device via a recording medium such as a CD or a DVD, or via a communication path such as a network. Alternatively, each unit of the terminal device 40 may be implemented by hardware resources such as a processor and an electronic circuit. In this implementation, a device such as a memory may be used.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming device comprising:
   an acquisition unit that accesses a plurality of storage devices each having image data stored therein, the plurality of storage devices having priorities, the acquisition unit accessing the plurality of storage devices in units of a certain number of storage devices in order starting with a storage device having a highest priority among the plurality of storage devices to acquire information concerning image data stored in a certain number of storage devices, the number of which is equal to the number of storage devices in each unit; and
   a display controller that causes information concerning image data acquired from a certain number of storage devices having a first priority among the plurality of storage devices, the number of which is equal to the number of storage devices in each unit, to be displayed on a display, and that, in response to receipt of instructions to continue acquisition, causes information concerning image data acquired from a certain number of storage devices having a second priority next to the first priority among the plurality of storage devices, the number of which is equal to the number of storage devices in each unit, to be displayed on the display.

2. The image forming device according to claim 1, wherein the display controller causes the information concerning the image data acquired from the certain number of storage devices having the first priority to be displayed on the display side-by-side in a predetermined display order, and
   in response to receipt of the instructions to continue acquisition, the display controller combines the information concerning the image data acquired from the certain number of storage devices having the first priority, and the information concerning the image data acquired from the certain number of storage devices having the second priority, and causes the combined information to be displayed on the display side-by-side in the display order.

3. The image forming device according to claim 1, wherein the acquisition unit accesses the certain number of storage devices having the first priority to acquire information concerning image data,
   in response to receipt of the instructions to continue acquisition, the acquisition unit accesses the certain number of storage devices having the second priority to acquire information concerning image data, and
   each time the acquisition unit acquires image data, the display controller causes information concerning the acquired image data to be sequentially displayed on the display.

4. The image forming device according to claim 2, wherein the acquisition unit accesses the certain number of storage devices having the first priority to acquire information concerning image data,
   in response to receipt of the instructions to continue acquisition, the acquisition unit accesses the certain number of storage devices having the second priority to acquire information concerning image data, and
   each time the acquisition unit acquires image data, the display controller causes information concerning the acquired image data to be sequentially displayed on the display.

5. The image forming device according to claim 1, wherein
the acquisition unit sequentially accesses the certain number of storage devices having the first priority and the certain number of storage devices having the second priority, in accordance with the priorities, to acquire information concerning image data, the display controller causes the information concerning the image data acquired from the certain number of storage devices having the first priority to be displayed on the display, and in response to receipt of the instructions to continue acquisition, the display controller causes the information concerning the image data acquired from the certain number of storage devices having the second priority to be displayed on the display.

6. The image forming device according to claim 2, wherein
the acquisition unit sequentially accesses the certain number of storage devices having the first priority and the certain number of storage devices having the second priority, in accordance with the priorities, to acquire information concerning image data, the display controller causes the information concerning the image data acquired from the certain number of storage devices having the first priority to be displayed on the display, and in response to receipt of the instructions to continue acquisition, the display controller causes the information concerning the image data acquired from the certain number of storage devices having the second priority to be displayed on the display.

7. The image forming device according to claim 1, wherein a storage device from which the number of times image data has been acquired is larger among the plurality of storage devices has a higher priority.

8. The image forming device according to claim 1, wherein a storage device in which the number of times image data has been stored is larger among the plurality of storage devices has a higher priority.

9. The image forming device according to claim 1, wherein the acquisition unit accesses the plurality of storage devices in accordance with the priorities, the priorities being specific to each user.

10. The image forming device according to claim 2, wherein the acquisition unit accesses the plurality of storage devices in accordance with the priorities, the priorities being specific to each user.

11. The image forming device according to claim 3, wherein the acquisition unit accesses the plurality of storage devices in accordance with the priorities, the priorities being specific to each user.

12. The image forming device according to claim 4, wherein the acquisition unit accesses the plurality of storage devices in accordance with the priorities, the priorities being specific to each user.

13. The image forming device according to claim 5, wherein the acquisition unit accesses the plurality of storage devices in accordance with the priorities, the priorities being specific to each user.

14. The image forming device according to claim 6, wherein the acquisition unit accesses the plurality of storage devices in accordance with the priorities, the priorities being specific to each user.

15. The image forming device according to claim 1, further comprising:

a unit that reduces a priority of a storage device to which the acquisition unit has failed to have access among the plurality of storage devices.

16. A non-transitory computer readable medium storing a program causing a computer to execute a process, the process comprising:

accessing a plurality of storage devices each having image data stored therein, the plurality of storage devices having priorities, the accessing including accessing the plurality of storage devices in units of a certain number of storage devices in order starting with a storage device having a highest priority among the plurality of storage devices to acquire information concerning image data stored in a certain number of storage devices, the number of which is equal to the number of storage devices in each unit; and causing information concerning image data acquired from a certain number of storage devices having a first priority among the plurality of storage devices, the number of which is equal to the number of storage devices in each unit, to be displayed on a display, and, in response to receipt of instructions to continue acquisition, causing information concerning image data acquired from a certain number of storage devices having a second priority next to the first priority among the plurality of storage devices, the number of which is equal to the number of storage devices in each unit, to be displayed on the display.

17. An image forming method comprising:

accessing a plurality of storage devices each having image data stored therein, the plurality of storage devices having priorities, the accessing including accessing the plurality of storage devices in units of a certain number of storage devices in order starting with a storage device having a highest priority among the plurality of storage devices to acquire information concerning image data stored in a certain number of storage devices, the number of which is equal to the number of storage devices in each unit; and causing information concerning image data acquired from a certain number of storage devices having a first priority among the plurality of storage devices, the number of which is equal to the number of storage devices in each unit, to be displayed on a display, and, in response to receipt of instructions to continue acquisition, causing information concerning image data acquired from a certain number of storage devices having a second priority next to the first priority among the plurality of storage devices, the number of which is equal to the number of storage devices in each unit, to be displayed on the display.

* * * * *